US012658656B2

(12) United States Patent
Wang et al.

(10) Patent No.: US 12,658,656 B2
(45) Date of Patent: Jun. 16, 2026

(54) CABLE CONNECTOR ASSEMBLY

(71) Applicants: Tyco Electronics (Shanghai) Co., Ltd., Shanghai (CN); TE Connectivity Svenska AB, Upplands Vasby (SE)

(72) Inventors: Yunhe (Bill) Wang, Shanghai (CN); Wenke He, Shanghai (CN); Stefan Borgas, Kista (SE); Hans Magnus Emil Andersson, Kista (SE); Songhua (Cedar) Liu, Dongguan (CN)

(73) Assignees: Tyco Electronics (Shanghai) Co., Ltd., Shanghai (CN); TE Connectivity Svenska AB, Upplands Vasby (SE)

( * ) Notice: Subject to any disclaimer, the term of this patent is extended or adjusted under 35 U.S.C. 154(b) by 489 days.

(21) Appl. No.: 18/451,919

(22) Filed: Aug. 18, 2023

(65) Prior Publication Data

US 2024/0063593 A1 Feb. 22, 2024

(30) Foreign Application Priority Data

Aug. 19, 2022 (CN) ........................ 202211002889.8

(51) Int. Cl.
*H01R 24/40* (2011.01)

(52) U.S. Cl.
CPC .................................. *H01R 24/40* (2013.01)

(58) Field of Classification Search
CPC ...... H01R 24/40; H01R 24/38; H01R 13/622; H01R 13/502; H01R 13/40; H01R 13/629
See application file for complete search history.

(56) References Cited

U.S. PATENT DOCUMENTS

| | | | | |
|---|---|---|---|---|
| 6,283,793 B1 * | 9/2001 | Nakata | H01R 4/185 | 439/404 |
| 2009/0191738 A1 * | 7/2009 | Kadar-Kallen | H01R 13/5202 | 439/207 |
| 2011/0306226 A1 * | 12/2011 | Montena | H01R 24/28 | 439/345 |
| 2012/0309227 A1 * | 12/2012 | Montena | H01R 9/0503 | 29/874 |
| 2019/0229452 A1 * | 7/2019 | Suzuki | H01R 24/50 | |
| 2019/0324221 A1 * | 10/2019 | Wan | H01R 13/502 | |
| 2020/0295502 A1 * | 9/2020 | Tanaka | H01R 13/5213 | |
| 2024/0063593 A1 * | 2/2024 | Wang | H01R 13/502 | |

* cited by examiner

*Primary Examiner* — Abdullah A Riyami
*Assistant Examiner* — Nader J Alhawamdeh
(74) *Attorney, Agent, or Firm* — Barley Snyder

(57) ABSTRACT

A cable connector assembly comprises a cable connection module and a shell module connectable thereto. The cable connection module includes a center conductor, a first insulation housing in which the center conductor is disposed, and a second insulation housing slidably fitted around the first insulation housing. The first insulation housing includes a guiding member sized to slidably guide an inner conductor of a cable assembly therethrough and into the center conductor. The shell module includes a metal shell connectable with the second insulation member. The cable connection module and the shell module are adapted such that, when the cable connection module and the shell module are assembled together with the cable assembly, a braid of the cable assembly fitted around the inner conductor of the cable assembly is fixed outside of the first insulation housing.

20 Claims, 6 Drawing Sheets

1000

CABLE CONNECTOR ASSEMBLY

CROSS-REFERENCE TO RELATED APPLICATIONS

This application claims the priority benefit of Chinese Patent Application No. 202211002889.8 filed on Aug. 19, 2022, the whole disclosure of which is incorporated herein by reference.

FIELD OF THE INVENTION

Embodiments of the present disclosure generally relate to electrical connectors and, more particularly, to a cable connector assembly.

BACKGROUND

Linear or straight cable connectors according to the prior art have several drawbacks. For example, existing designs utilize a large number of components, require relatively complex assembly processes, are large in size and are high in cost. In an application scenario (e.g., an aerial work environment such as outdoor high-voltage cable connections) requiring on-site assembly, the disadvantages such as the large number of components and the relatively complex assembly process bring great inconvenience.

More specifically, during assembly of these cable connector, an inner conductor of the cable assembly is often difficult to be smoothly inserted into a center conductor of the cable connector. Further, after the inner conductor of the cable assembly is fixed to the center conductor of the cable connector by a screw, an additional insulation component needs to be fitted at the screw hole to prevent the screw from contacting a metal shell of the cable connector (especially in the case of the screw being loosened), thereby achieving the function of electrically isolating the center conductor from the metal shell. Moreover, a braid of the cable assembly often covers the screw hole directly or moves to cover the screw hole after assembly. This is very likely to cause braid wires or braid debris of the braid to enter the screw hole, and to come into contact with the screw for fastening the electrical connection between the inner conductor and the center conductor, creating a short circuit.

SUMMARY

According to an embodiment of the present disclosure, a cable connector assembly comprises a cable connection module and a shell module connectable thereto. The cable connection module includes a center conductor, a first insulation housing in which the center conductor is disposed, and a second insulation housing slidably fitted around the first insulation housing. The first insulation housing includes a guiding member sized to slidably guide an inner conductor of a cable assembly therethrough and into the center conductor. The shell module includes a metal shell connectable with the second insulation member. The cable connection module and the shell module are adapted such that, when the cable connection module and the shell module are assembled together with the cable assembly, a braid of the cable assembly fitted around the inner conductor of the cable assembly is fixed outside of the first insulation housing.

BRIEF DESCRIPTION OF THE DRAWINGS

The invention will now be described by way of example with reference to the accompanying Figures, of which.

DETAILED DESCRIPTION OF THE EMBODIMENTS

Figure 1:
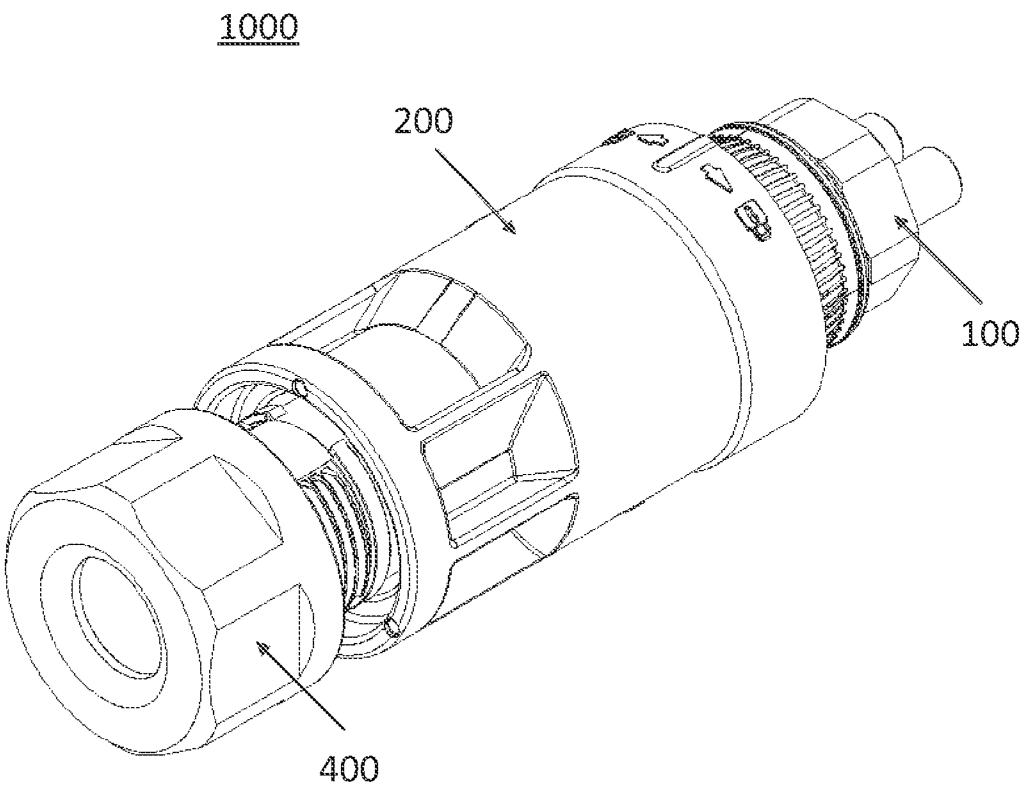
FIG. 1 is a schematic perspective view of a cable connector assembly according to an exemplary embodiment of the present disclosure in a state in which a cable assembly is not yet assembled into the cable connector assembly.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a cable connector assembly including a cable connection module and a shell module. The cable connection module comprises a central conductor, a first insulation housing and a second insulation housing. The central conductor is disposed in the first insulation housing, and the second insulation housing is slidably fitted around the first insulation housing. The shell module includes a metal shell. The cable connection module and the shell module are adapted such that, when the cable connection module and the shell module are assembled together with a cable assembly: 1) the cable connection module and the shell module are connected together by an engagement between the metal shell and the second insulation housing; 2) an inner conductor of the cable assembly is electrically connected to the center conductor in the first insulation housing in a manner of being smoothly guided to the center conductor by passing through a guiding member provided in the first insulation housing; and 3) a braid of the cable assembly fitted around the inner conductor is fixed outside the first insulation housing.

According to an exemplary embodiment of the present disclosure, referring to FIGS. 1-7, a cable connector assembly 1000 is provided. The cable connector assembly 1000 is adapted to be assembled and used with a cable assembly 300 and includes a cable connection module 100, a shell module 200, a nut cover 400 and a sealing ring 410 for the nut cover. The cable connection module 100, the shell module 200, the nut cover 400, and the seal ring 410 are separate components or modules before being assembled with the cable assembly 300. After being assembled with the cable assembly 300, these components or modules constitute a complete cable connector together with the cable assembly 300, as shown in FIGS. 1-5.

The cable connection module 100 according to an exemplary embodiment of the present disclosure mainly includes a center conductor 110, a first insulation housing 120 and a second insulation housing 130. The center conductor 110 is disposed in the first insulation housing 120, and the second insulation housing 130 is slidably fitted around the first insulation housing 120. The shell module 200 includes a metal shell 210 and an insulation shell 220. The insulation shell 220 is fitted around the metal shell 210. The first insulation housing 120, the second insulation housing 130 and the insulation shell 220 (and a guiding member 190, which will be described in detail below) may be made of a plastic material.

As shown in FIGS. 1-5, the cable connection module 100 and the shell module 200 are configured such that, when the cable connection module 100 and the shell module 200 are assembled together with the cable assembly 300, the cable connection module and the shell module are connected together by an engagement between the metal shell 210 and the second insulation housing 130; an inner conductor 310 of the cable assembly is electrically connected to the center conductor 110 in the first insulation housing 120 in a manner of being smoothly guided into the center conductor by passing through a guiding member 190 provided in the first insulation housing 120; and a braid 320 of the cable assembly fitted around the inner conductor is fixed outside the first insulation housing.

Figure 4:
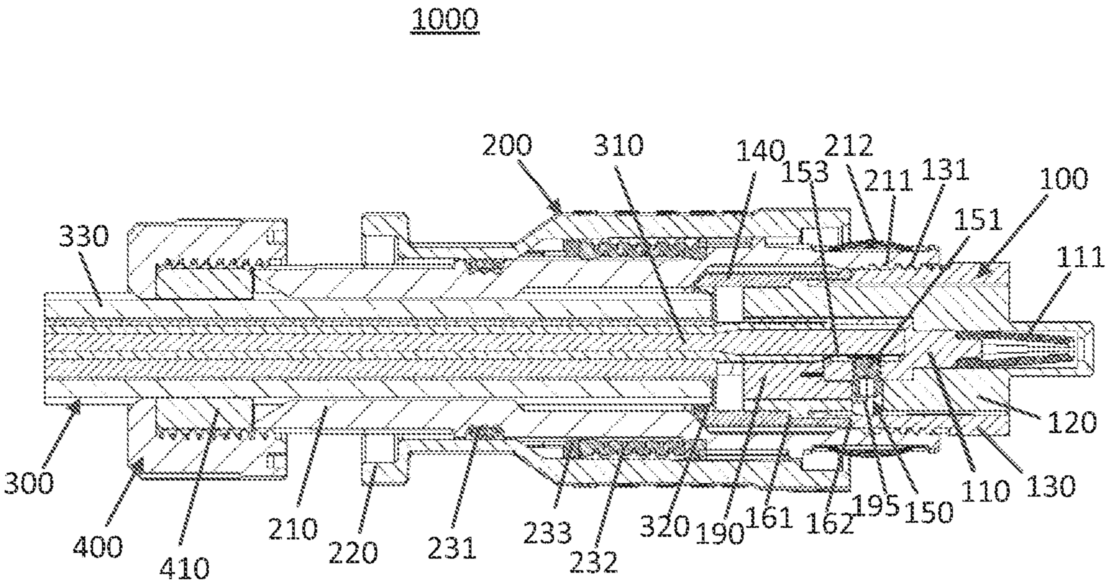
FIG. 4 is a schematic cross-sectional view of the cable connector assembly in the state shown in FIG. 2.
Figure 8:
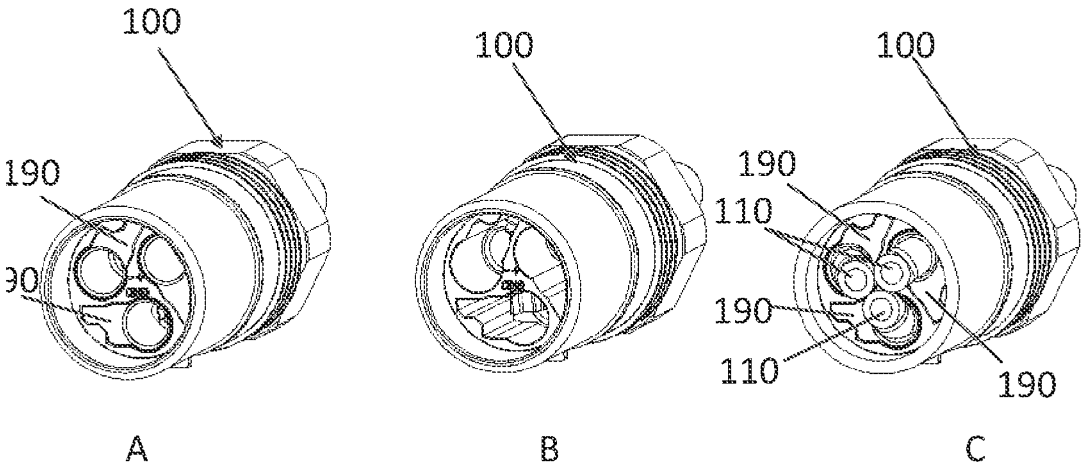
FIG. 8 is a schematic enlarged perspective view of a cable connection module of a cable connector assembly according to another exemplary embodiment of the present disclosure.

In addition, as shown in FIG. 4, the cable assembly 300 further includes an insulation layer 330 wrapped around the inner conductor 310 and the braid 320. The central conductor 110 is electrically connected to a conductive terminal 111, and the conductive terminal is disposed in a hole of the cable connection module 100. For example, FIG. 8 is a schematic perspective view of a cable connection module of a cable connector assembly according to an exemplary embodiment of the present disclosure. The cable connector assembly in this exemplary embodiment is a three-port cable connector 3*p*. Specifically, A in FIG. 8 shows a state in which the guiding member 190 has been fitted into the cable connection module 100. B in FIG. 8 shows a state in which the guiding member 190 has not been fitted into the cable connection module 100. C in FIG. 8 shows a state in which the center conductor 110 is inserted into the cable connection module 100 by the guiding member 190 that has been fitted into the cable connection module. According to the cable connector assembly provided by the exemplary embodiment of the present disclosure, a design of fewer components such as the shell module and the cable connection module is adopted, which increases the ease of on-site assembly.

Figure 2:
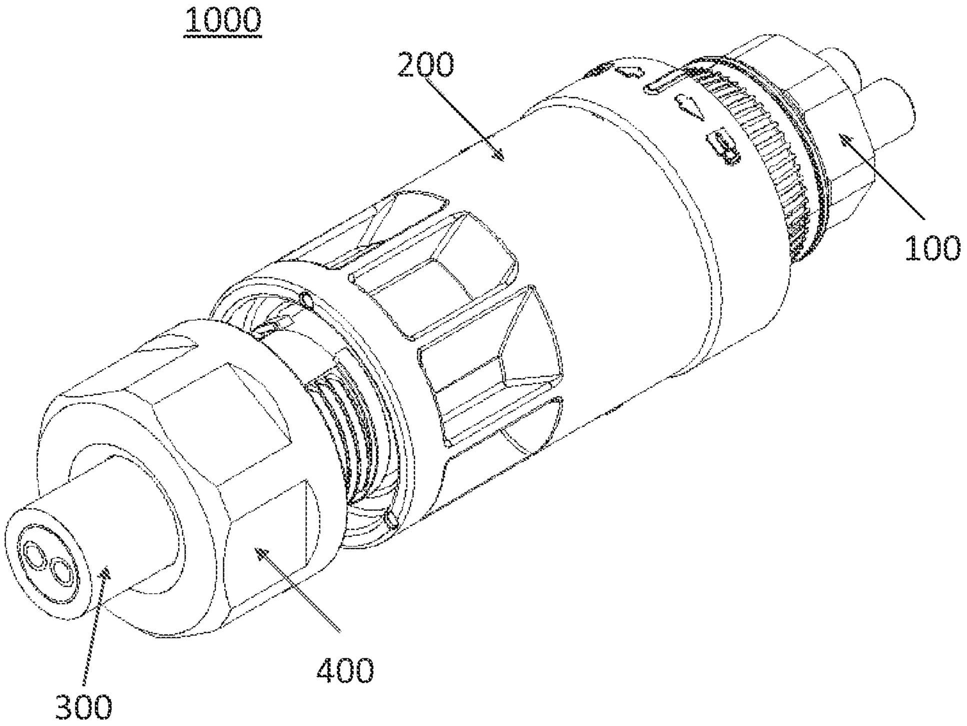
FIG. 2 is a schematic perspective view of a cable connector assembly according to an exemplary embodiment of the present disclosure in a state in which a cable assembly has been assembled into the cable connector assembly.

Referring to FIGS. 2 and 4, the cable connection module 100 further includes a fastener fitting hole 150 running through both the first insulation housing 120 and the center conductor 110. A fastener 151 is provided in the fastener fitting hole 150, and is used to electrically connect the inner conductor 310 to the center conductor 110 in a pressure-tight manner when the cable connection module 100 and the shell module 200 are assembled together with the cable assembly 300. In this way, the connection between the inner conductor 310 of the cable assembly 300 and the center conductor 110 of the cable connection module 100 may be stably and reliably maintained.

Figure 6:
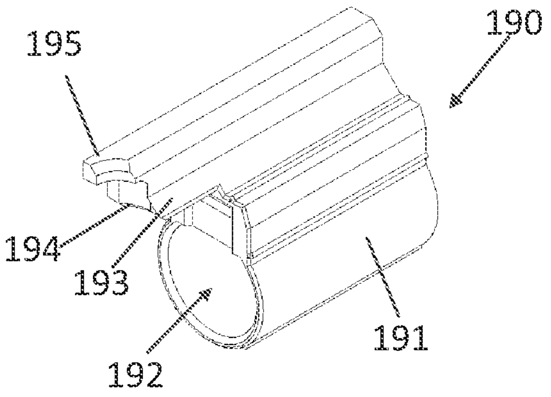
FIG. 6 is a schematic enlarged perspective view of a guiding member of a cable connection module of a cable connector assembly according to an exemplary embodiment of the present disclosure.

Referring to FIGS. 4 and 6, the guiding member 190 includes a cylindrical body 191 defining a through-hole 192 (as shown in FIG. 4) for the inner conductor 310 to pass therethrough. With the above configuration, it is possible to easily and smoothly insert the inner conductor 310 of the cable assembly 300 into the center conductor 110 of the cable connector module 100 through the through-hole 192 of the guiding member 190.

The guiding member 190 further includes a first portion 193. The first portion 193 extends from the cylindrical body 191 in a direction in which a central axis of the cylindrical body 191 is located. Specifically, the first portion 193 of the guiding member 190 together with the first insulation housing 120 and the center conductor 110 collectively define the fastener fitting hole 150. More specifically, the fastener fitting hole 150 is formed with an internal thread, and the first portion 193 of the guiding member 190 is formed with a threaded section 194 constituting the internal thread.

According to an exemplary embodiment of the present disclosure, the guiding member 190 further includes a latch portion 195. The latch portion 195 extends from the cylindrical body 191 in the direction in which the central axis of the cylindrical body is located, and extends beyond the first portion 193 to restrain the fastener 151 in the fastener fitting hole 150. It should be noted that before assembly, the fastener 151 in the cable connection module 100 is pre-locked in a center conductor portion of the fastener fitting hole 150. During assembly, a screwdriver is inserted into the fastener fitting hole 150, and the fastener 151 is loosened from the central conductor portion of the fastener assembly hole. After the inner conductor 310 of the cable assembly 300 is contact-connected with the central conductor 110 of the cable connection module 100, the fastener 151 is locked again in the central conductor portion of the fastener fitting hole 150. As a result, a reliable connection between the inner conductor of the cable assembly and the central conductor of the cable connection module is achieved in a pressure-tight manner. The latch portion 195 is provided to prevent the fastener 151 from falling out of the fastener fitting hole 150, particularly after the assembly is completed.

Still referring to FIGS. 4 and 6, the guiding member 190 further includes a metal pressing sheet 153. The metal pressing sheet 153 is embedded in the cylindrical body 191, and is adapted to be positioned between the fastener 151 and the inner conductor 310 when the cable connection module 100 and the shell module 200 are assembled together with the cable assembly 300. The metal pressing sheet 153 abuts against the fastener 151 to prevent the fastener from damaging the inner conductor 310 of the cable assembly 300.

According to an exemplary embodiment of the present disclosure, as shown in FIGS. 1-7, the cable connection module 100 further includes a metal ring 140 fitted around the first insulation housing 120. The braid 320 is fixed outside the metal ring 140 when the cable connection module 100 and the shell module 200 are assembled together with the cable assembly 300. More specifically, the metal ring 140 extends beyond an end face of the first insulation housing 120, and a length of the metal ring 140 is configured such that, when the cable connection module 100 and the shell module 200 are assembled together with the cable assembly 300, the metal ring causes the braid 320 to be abutted against an inner surface of the metal shell 210. By forming the metal ring 140 to a certain predetermined length, the braid 320 is prevented from being fitted directly around the first insulation housing 120. As the first insulation housing 120 is made of plastic, this arrangement prevents first insulation housing from being deformed by pressure applied by the braid 320. Further, by limiting the length of the metal ring 140, not only can a smaller resistance be achieved, but also no trimming of the braid 320 before assembly is required, thereby simplifying the assembly process.

Figure 7:
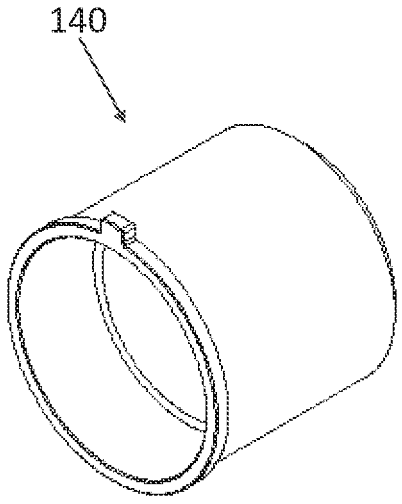
FIG. 7 is a schematic enlarged perspective view of a metal ring of a cable connection module of a cable connector assembly according to an exemplary embodiment of the present disclosure.
Figure 7A:
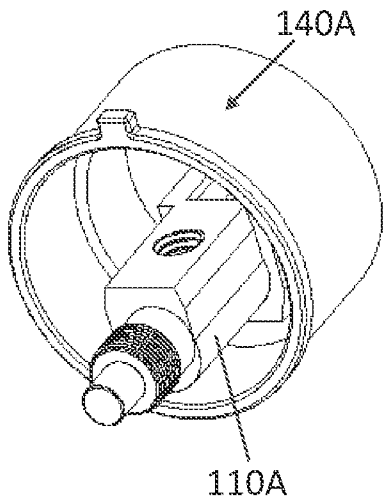
FIG. 7A is a schematic enlarged perspective view of a metal ring of a cable connection module of a cable connector assembly according to another exemplary embodiment of the present disclosure.

One or more center conductors 110 are provided in the first insulation housing 120. The metal ring 140 is fitted around the first insulation housing 120 and is separated from the one or more center conductors 110. Alternatively, according to another exemplary embodiment of the present disclosure, as shown in FIG. 7A, in the cable connection module, the metal ring 140A is fitted around the first insulation housing and formed as one piece with one of the one or more center conductor(s) 110A. The remaining center conductors 110 are separated from the one piece.

Figure 3:
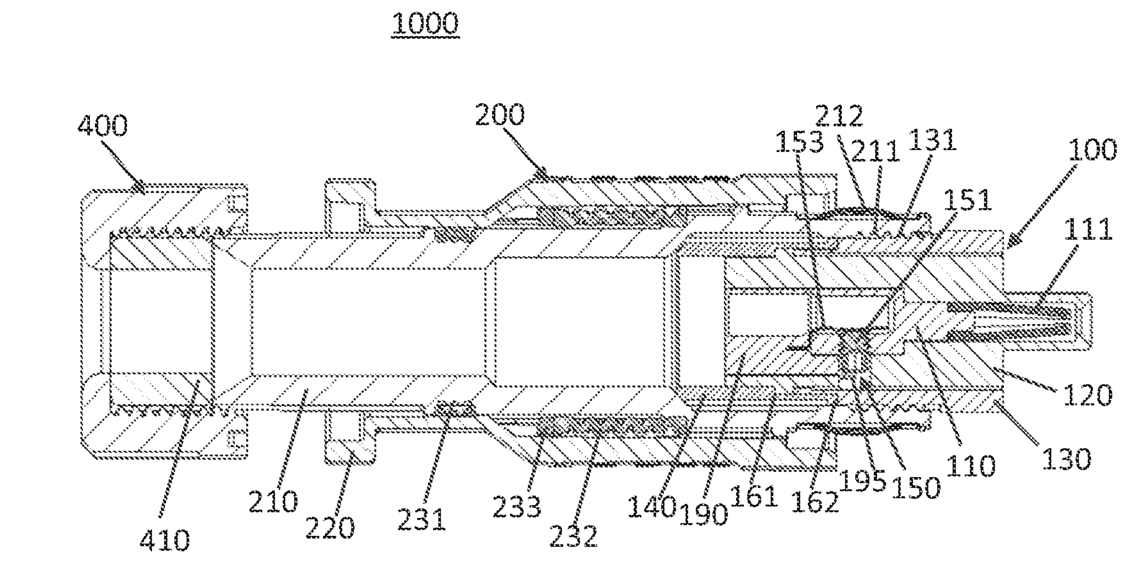
FIG. 3 is a schematic cross-sectional view of the cable connector assembly in the state shown in FIG. 1.
Figure 5:
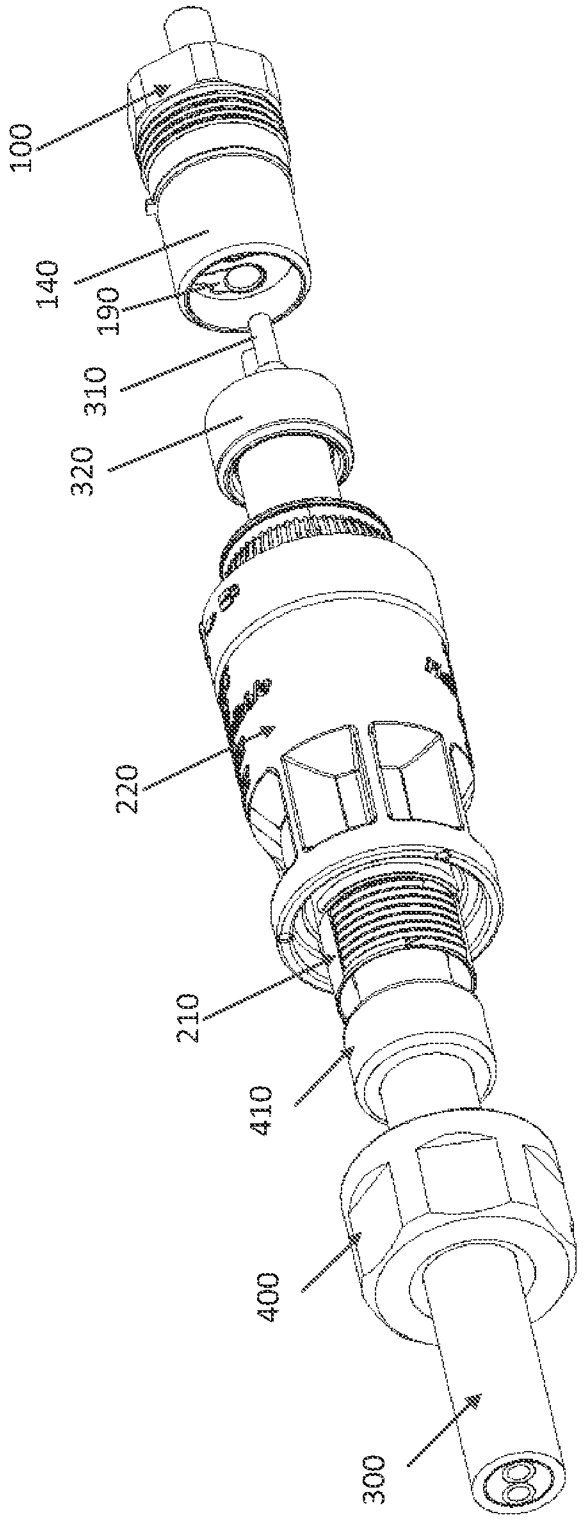
FIG. 5 is a schematic perspective view of a cable connector assembly according to an exemplary embodiment of the present disclosure in an unassembled state.

According to an exemplary embodiment of the present disclosure, as shown in FIGS. 3-5, the second insulation housing 130 covers the fastener fitting hole 150 when the cable connection module 100 and the shell module 200 are assembled together with the cable assembly 300. Before assembly, the second insulation housing 130 is slidable relative to the first insulation housing 120, for example, to expose the fastener fitting hole 150 in the first insulation housing. In this way, the second insulation housing 130 of the cable connection module 100 directly covers the fastener fitting hole 150 after the assembly is completed. At the same time the number of the components is reduced, and the fastener is prevented from falling out of the fitting hole or external scraps are prevented from entering the fitting hole, thereby avoiding short circuits.

In the cable connection module 100, an outer surface of the first insulation housing 120 is provided with a first limiting structure 161, an outer surface of the second insulation housing 130 is provided with a second limiting structure 162, and the metal ring 140 abuts against the first limiting structure and the second limiting structure, respectively. In the illustrated embodiment, the first and second limiting structures 161,162 may be boss structures or a step structures.

The inner surface of the metal shell 210 is provided with an internal thread structure 211, and the outer surface of the second insulation housing 130 of the cable connection module 100 is provided with an external thread structure 131. The metal shell 210 is assembled with the cable connection module 100 by a screw connection between the internal thread structure 211 and the external thread structure 131. The assembly process between the cable connection module 100 and the shell module 200 is simplified by this configuration.

Still referring to FIGS. 3-5, the insulation shell 220 is fitted around the metal shell 210 in the shell module 200. Specifically, as shown in FIG. 2, the insulation shell 220 is fitted around a periphery of the metal shell 210 in a sealed manner by a seal ring 231. A compressible bushing 232 and a support ring 233 are disposed between the insulation shell 220 and the metal shell 210.

According to one exemplary embodiment of the present disclosure, as shown in FIGS. 1-5, in addition to the cable connection module 100 and the shell module 200 described in detail above, the cable connector assembly 1000 includes the nut cover 400 provided with the sealing ring 410. The nut cover 400 is detachably fitted to the shell module 200. Specifically, as shown in FIGS. 4 and 5, when the cable connection module 100 and the shell module 200 are assembled together with the cable assembly 300, one end of the metal shell 210 is fitted with the cable connection module, and the opposite end of the metal shell is fitted with the nut cover 400. In addition, a shielding metal spring 212 is fitted around one end of the metal shell 210.

Figure 9:
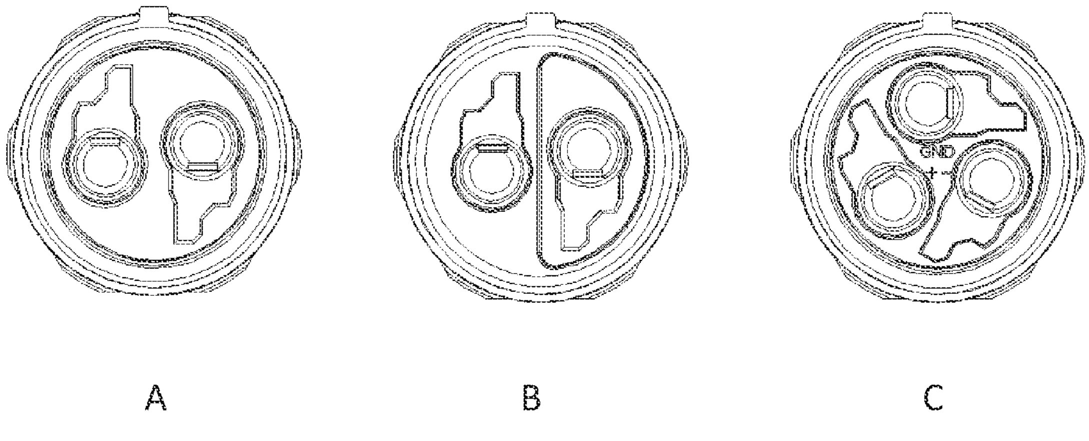
FIG. 9 shows different application examples of a cable connector assembly according to embodiments of the present disclosure.

The cable connector assembly 1000 according to embodiments of the present disclosure may be embodied as a dual-port cable connector and a three-port cable connector. According to an exemplary embodiment of the present disclosure, in the cable connection module 100, one or more center conductors 110 are provided in the first insulation housing 120, and the cable assembly 300 includes a corresponding number of one or more inner conductors 310. One guiding member 190 is provided for each inner conductor 310 so that each inner conductor can be smoothly guided into the corresponding center conductor 110. For example, FIG. 9 shows different application examples of the cable connector assembly according to embodiments of the present disclosure. Embodiments A and B in FIG. 9 show the cable connector assembly according to embodiments of the present disclosure adapted to two-port direct current cable connectors 2*p* DC-I and 2*p* DC-C, respectively, and embodiment C shows the cable connector assembly according to embodiments of the present disclosure adapted to a three-port cable connector 3*p*.

According to the cable connector assembly provided by the forgoing various exemplary embodiments of the present disclosure, the design of fewer components such as the shell module and the cable connection module is adopted, which is convenient for an operator to perform an on-site assembly. According to the cable connector assembly provided by the foregoing various exemplary embodiments of the present disclosure, the inner conductor of the cable assembly may be smoothly, continuously or uninterruptedly inserted into the center conductor of the cable connector by the guiding member. The braid of the cable assembly is fixed by the metal ring having a certain length, thereby avoiding the braid being randomly displaced after assembly. Therefore, the cable connector assembly provided by the forgoing various exemplary embodiments of the present disclosure has advantages of a reliable structure, low cost, simple assembly and improved compatibility compared to the related art.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of the elements or steps, unless such exclusion is explicitly stated. Furthermore, references to “one embodiment” of the present disclosure are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. A cable connector assembly, comprising: a cable connection module, including: a center conductor; a first insulation housing in which the center conductor is disposed, the first insulation housing including a guiding member sized to slidably guide an inner conductor of a cable assembly therethrough and into the center conductor; and a second insulation housing slidably fitted around the first insulation housing; and a shell module including a metal shell connectable with the second insulation housing, the cable connection module and the shell module are adapted such that, when the cable connection module and the shell module are assembled together with the cable assembly, a braid of the cable assembly fitted around the inner conductor of the cable assembly is fixed outside of the first insulation housing.

2. The cable connector assembly according to claim 1, wherein the guiding member comprises a cylindrical body defining a through-hole adapted to receive the inner conductor therethrough.

3. The cable connector assembly according to claim 2, wherein the cable connection module further comprises:

- a fastener fitting hole running through both the first insulation housing and the center conductor; and
- a fastener arranged in the fastener fitting hole.

4. The cable connector assembly according to claim 3, wherein the fastener is adapted to electrically connect the inner conductor to the center conductor in a pressure-tight manner when the cable connection module and the shell module are assembled together with the cable assembly.

5. The cable connector assembly according to claim 3, wherein the guiding member further comprises a first portion extending from the cylindrical body in a direction of a central axis of the cylindrical body, the first portion of the guiding member, the first insulation housing and the center conductor collectively defining the fastener fitting hole.

6. The cable connector assembly according to claim 5, wherein the fastener fitting hole is formed with an internal thread, and the first portion of the guiding member is formed with a threaded section constituting the internal thread.

7. The cable connector assembly according to claim 5, wherein the guiding member further comprises a latch portion extending from the cylindrical body in the direction of the central axis of the cylindrical body, and extending beyond the first portion to restrain the fastener in the fastener fitting hole.

8. The cable connector assembly according to claim 5, wherein the guiding member further comprises a metal pressing sheet embedded in the cylindrical body and configured to be positioned between the fastener and the inner conductor when the cable connection module and the shell module are assembled together with the cable assembly.

9. The cable connector assembly according to claim 1, wherein the cable connection module further comprises a metal ring fitted around the first insulation housing, the braid of the cable assembly being fixable outside of the metal ring when the cable connection module and the shell module are assembled together with the cable assembly.

10. The cable connector assembly according to claim 9, wherein, in the cable connection module, the metal ring is fitted around the first insulation housing and is formed as one piece with the center conductor.

11. The cable connector assembly according to claim 9, wherein the metal ring extends beyond an end face of the first insulation housing, and the metal ring is adapted to cause the braid to be abutted against an inner surface of the metal shell when the cable connection module and the shell module are assembled together with the cable assembly.

12. The cable connector assembly according to claim 9, wherein, in the cable connection module, an outer surface of the first insulation housing includes a first limiting structure, and an outer surface of the second insulation housing includes a second limiting structure, the metal ring abutting against the first limiting structure and the second limiting structure.

13. The cable connector assembly according to claim 9, wherein the cable connection module includes a plurality of the center conductors and a corresponding plurality of the guiding members in the first insulation housing, each center conductor and each guiding member adapted to receive one of a plurality of inner conductors of the cable assembly.

14. The cable connector assembly according to claim 9, wherein, in the cable connection module, the metal ring is fitted around the first insulation housing and is separated from the plurality of center conductors.

15. The cable connector assembly according to claim 1, wherein the first insulation housing, the second insulation housing and the guiding member are made of a plastic material.

16. A cable connector, comprising: a cable connection module, including: a center conductor; a first insulation housing in which the center conductor is disposed, the first insulation housing including a guiding member; and a second insulation housing slidably fitted around the first insulation housing; a shell module including a metal shell connected with the second insulation housing; and a cable assembled with the cable connection module and the shell module, including: an inner conductor slidably guided through the guiding member and into the center conductor; and a braid fitted around the inner conductor and fixed outside of the first insulation housing.

17. The cable connector according to claim 16, wherein the guiding member comprises a cylindrical body defining a through-hole receiving the inner conductor therethrough.

18. The cable connector according to claim 16, wherein the cable connection module further comprises:

- a fastener fitting hole extending through both the first insulation housing and the center conductor; and
- a fastener arranged in the fastener fitting hole.

19. The cable connector according to claim 16, wherein the cable connection module further comprises a metal ring fitted around the first insulation housing, the braid of the cable being fixed outside of the metal ring when the cable connection module and the shell module are assembled together with the cable.

20. The cable connector according to claim 19, wherein, in the cable connection module, an outer surface of the first insulation housing includes a first limiting structure, and an outer surface of the second insulation housing includes a second limiting structure, the metal ring abutting against the first limiting structure and the second limiting structure.

* * * * *